Figure 1:
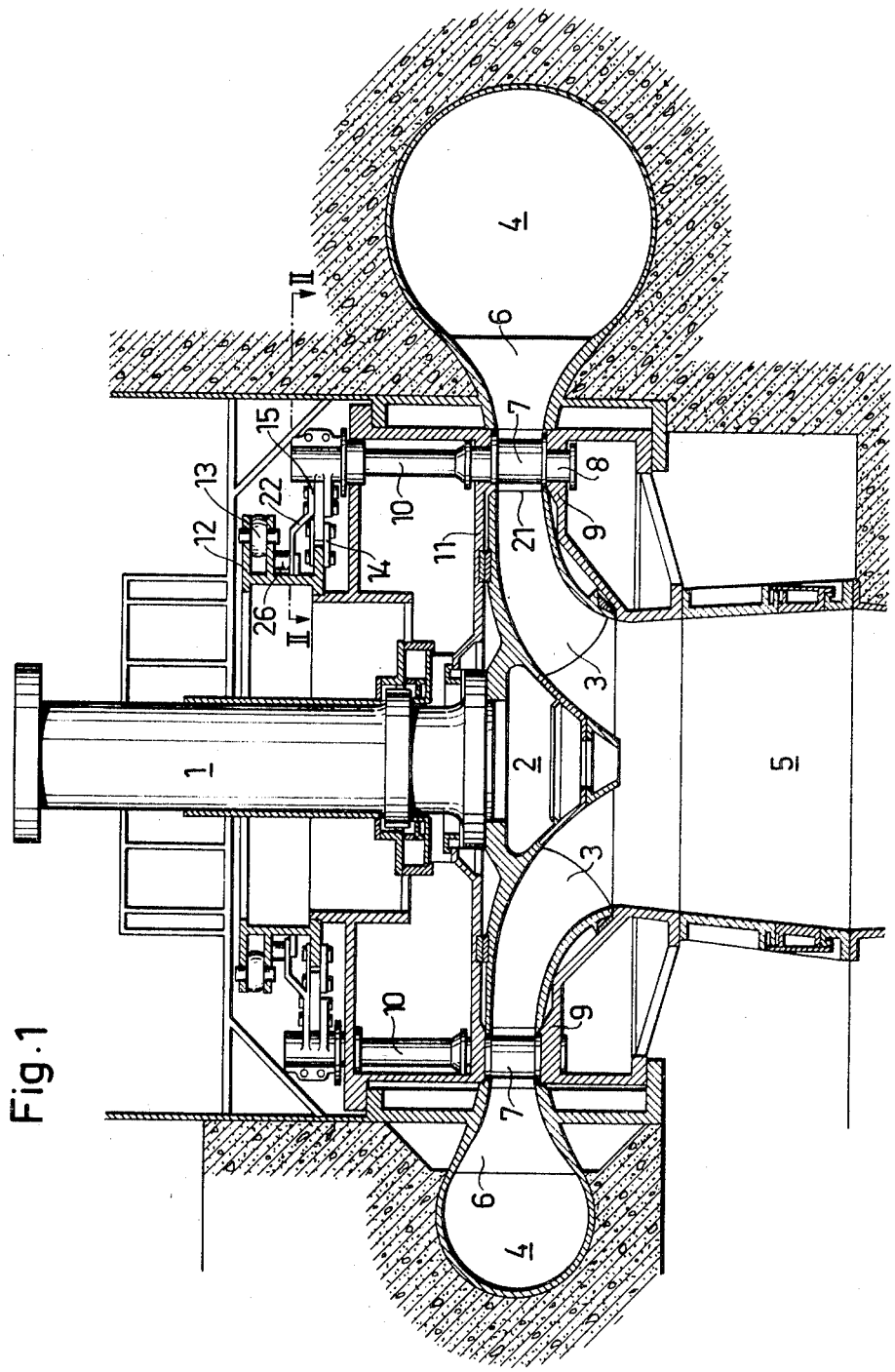

United States Patent
Munkstrand

[15] 3,639,072
[45] Feb. 1, 1972

[54] DEVICE FOR LIMITING THE MOVEMENTS OF THE WICKET GATES IN A WATER TURBINE

[72] Inventor: Nils Eric Munkstrand, Trollhattan, Sweden
[73] Assignee: Aktiebolaget Nohab, Trollhattan, Sweden
[22] Filed: Jan. 13, 1970
[21] Appl. No.: 2,204

[30] Foreign Application Priority Data
Jan. 15, 1969 Sweden..........................497/69

[52] U.S. Cl. ..........................................415/9
[51] Int. Cl. ....................................F01d 25/16
[58] Field of Search..............................415/9

[56] References Cited

UNITED STATES PATENTS

| | | | |
|---|---|---|---|
| 1,517,896 | 12/1924 | Enz | 415/9 |
| 1,641,755 | 9/1927 | Gross et al. | 415/9 |
| 1,725,421 | 8/1929 | Rogers | 415/9 |

*Primary Examiner*—C. J. Husar
*Attorney*—Hane, Baxley & Spiecens

[57] ABSTRACT

The turbine wicket gate regulator ring is connected to a crank secured to each wicket gate stem and comprising an inner portion securely connected with the crank hub and an outer portion which is connected with the inner portion by means of a shear pin. A crank extension extends from the inner crank arm portion with a length which is such that the adjacent crank hub and a portion of the regulator ring projects into the range of oscillation of the extension to act as a barrier against movement thereof and by contact to restrict the angle of oscillation.

6 Claims, 4 Drawing Figures

INVENTOR
NILS ERIC MUNKSTRAND
BY Hane and Baxley
ATTORNEYS

DEVICE FOR LIMITING THE MOVEMENTS OF THE WICKET GATES IN A WATER TURBINE

The present invention relates to an arrangement for restricting the movement of the wicket gates in a water turbine, pump turbine or the like having a regulatable mechanism for the wicket gates which comprises a regulating or adjusting ring capable of being rotated by means of servomotors, a crank securely attached to each wicket gate stem and a link connecting the regulating ring and the crank. The crank arm comprises an inner portion, which is connected with the hub of the crank, and an outer portion, which is connected therewith by means of a shear joint.

In regulating mechanisms of the described type the shear joint, which in practice comprises a shear pin, normally shears when an object comes between two wicket gates. In mechanisms known hitherto, when the shear pin breaks, the wicket gates are liable to swing around and come into contact with the outer periphery of the runner, resulting in damage. Much serious damage has been caused to turbines and pump turbines in this manner. Another disadvantage associated with known systems, especially pump turbines, is the manner in which the wicket gates are locked; it being necessary to lock the wicket gates as a result of the vibrations which occur during pumping. Hitherto, the wicket gates have normally been locked by a locking means which acts on the wicket gate stem. In such arrangements, should the servomotors receive instructions to change the positions of the wicket gates without the locking means having been released, the shear pins on all cranks will break, resulting in considerable inconvenience.

An object of the present invention is to eliminate the aforementioned problems associated with restricting the extent of wicket gate movement and the locking thereof. This and other objects are realized by means of the arrangement of the invention, which is mainly characterized by a crank extension which extends from the inner crank arm portion or directly from the crank hub and the length of which is such that the adjacent crank hub and a portion of the regulator ring projects into the range of oscillation of the ring to act as a barrier against movement thereof and by contact to restrict the angle of oscillation.

Figure 2:
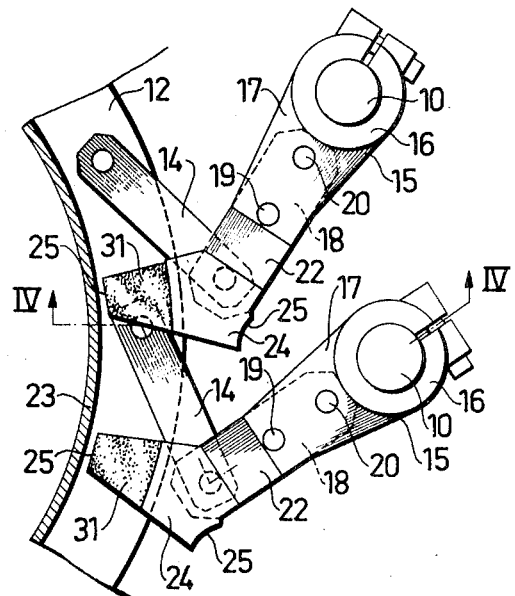
Figure 3:
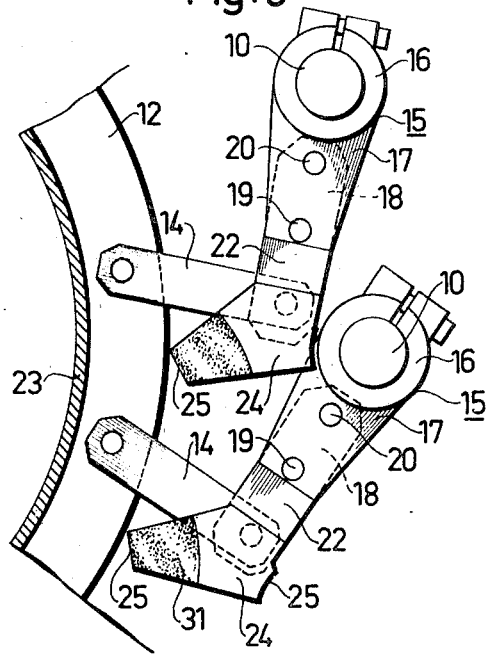
Figure 4:
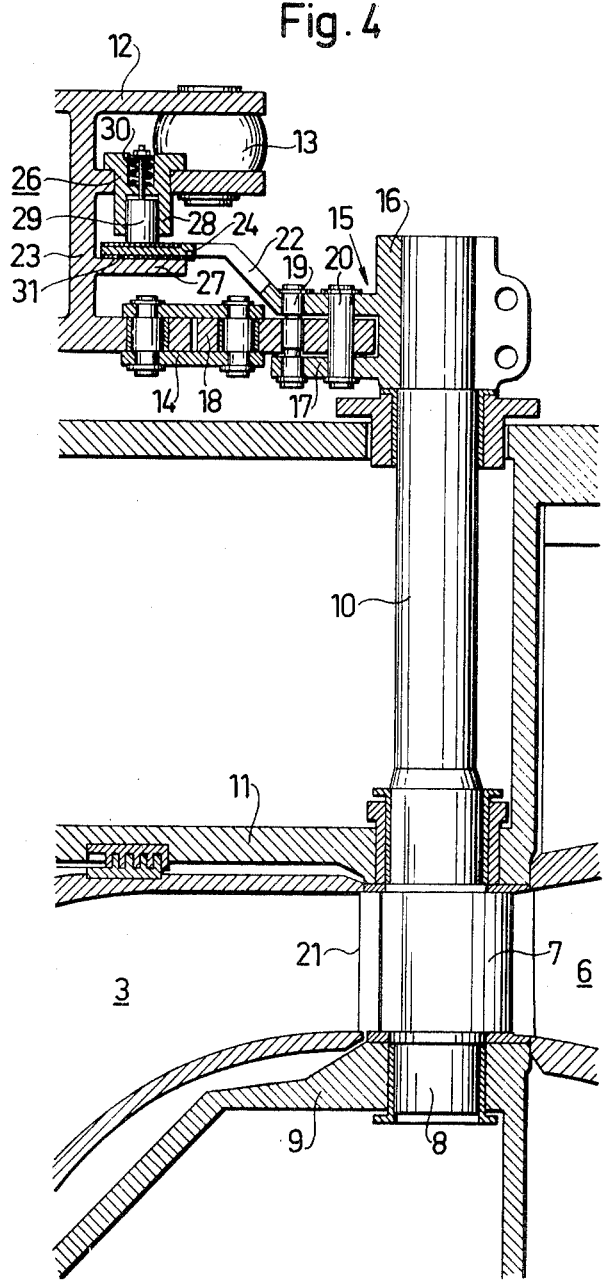

The invention will now be described with reference to the accompanying drawings, in which FIG. 1 shows a diametrical section through a Francis turbine provided with an arrangement according to the invention, FIGS. 2 and 3 are horizontal sections along the line II—II in FIG. 1 in enlarged scale showing two wicket gate cranks in open and closed position respectively, and FIG. 4 is a vertical section along the line IV—IV in FIG. 2.

The Francis turbine shown in FIG. 1 comprises in a known manner a runner 2 arranged on a turbine shaft 1 and having runner blades 3, a spiral case 4, a suction pipe 5, a stay ring with stay column 6, a wicket gate mechanism with wicket gates 7 whose lower stems 8 are journaled in a wicket gate operating ring 9 and the upper stems 10 of which are journaled in a turbine cover 11, and a regulating mechanism for adjusting the position of the wicket gates. The regulator mechanism comprises a regulator or adjuster ring 12 in which is pivotally secured rods 13 to the wicket gate mechanism servomotors. The movement is transmitted from the adjuster ring 12 to the stems of the wicket gates by means of a link 14 and a crank 15 for each wicket gate stem.

As is more clearly illustrated in FIGS. 2–4, the crank 15 comprises a crank hub 16 secured to the wicket gate stem 10 and a crank arm which comprises an inner portion 17 secured to the hub and an outer portion 18 which is secured to the inner portion by means of a shear joint. The shear joint consists of a shear pin 19. In other respects the parts are connected with a normal bolt 20, which together with the shear pin, when the latter is whole and unbroken, provides a moment transmitting joint in the crank arm.

To prevent the wicket gates from swinging when the shear pin breaks and coming into contact with the outer periphery 21 of the runner blades, thereby resulting in damage, the inner stationary portion 17 of the crank arm has, in accordance with the invention, been provided with a crank extension 22. This is swung upwards so that it passes free of the line 14, and the link is such that the adjacent crank hub and web 23 on the adjuster ring projects inwardly to impede movement in the area of oscillation thereof and by contact restrict the angle of oscillation. For this purpose the crank extension is provided at the free end thereof with an angular member 24 having an abutment surface 25, which may optionally be provided with a shock-absorbing material.

To enable the wicket gates to be locked in pumping position in a manner not encumbered with the disadvantages mentioned in the introduction, the angular member 24 is adapted so as to enable it to cooperate with a hydraulic lock 26 and an anvil 27 arranged on the adjuster ring 12. The anvil is in the form of a shelf, projecting out from the web 23 of the adjuster ring. The hydraulic lock consists of a single-acting cylinder 28 having a piston 29, which in released position retracts a spring 30. When in a locked position, the piston 29 securely clamps the crank extension 22 against the anvil 27. The crank extension 22 is suitably provided with a fitting wear coating 31 on the locking surfaces. Since locking is effective between crank and adjuster ring there is no risk of the shear pin breaking if the servomotors receive instructions to adjust the position of the wicket gates, despite the fact that the lock has not been released.

I claim:

1. An arrangement for restriction of movement of the wicket gates in a water turbine, pump turbine or the like having a wicket gate regulator mechanism, the arrangement comprising a regulator ring capable of being rotated by servomotors, a crank secured to each wicket gate stem and a link connecting the regulator ring and the crank, the crank arm comprising an inner portion which is connected with the inner portion by means of a shear pin, characterized by a crank extension (22) which is connected to the crank hub (16) and the length of which is such that said crank hub (16) and a portion of the regulator ring (12) project into the range of oscillation of said extension to act as a barrier against movement thereof and by contact to restrict the angle of oscillation.

2. An arrangement as claimed in claim 1, characterized in that the free end of the crank extension (22) forms an angular member (24) which extends in the oscillating plane of the crank extension substantially at right angles to the abutment surfaces on the movement restricting barriers (12,16) and which has a length which determines the maximum path of movement of the wicket gates (7).

3. An arrangement as claimed in claim 2, characterized in that the portion of the regulator ring (12) which forms the movement restriction barrier is formed by the web (23) of the ring (12).

4. The arrangement as claimed in claim 2, characterized in that the abutment surfaces (25) on the angular member (24) are provided with shock-absorbing material.

5. An arrangement as claimed in claim 1, characterized in that the free end of the crank extension (22) is adapted to cooperate with a wicket gate movement lock (26) arranged on the regulator ring (12).

6. An arrangement as claimed in claim 5, characterized in that the lock (26) includes a hydraulically operated piston (29) which is adapted to urge the end of the crank extension (22) against an anvil (27) on the regulator ring (12).

* * * * *